United States Patent
Kim et al.

(10) Patent No.: US 9,288,068 B2
(45) Date of Patent: Mar. 15, 2016

(54) METHOD AND APPARATUS FOR TRANSMITTING PARAMETERS TO MULTICAST AGENT IN RELAYED MULTICAST NETWORK

(71) Applicant: ELECTRONICS AND TELECOMMUNICATIONS RESEARCH INSTITUTE, Daejeon-si (KR)

(72) Inventors: Sung Hei Kim, Daejeon-si (KR); Chang Kyu Lee, Daejeon-si (KR); Shin Gak Kang, Daejeon-si (KR)

(73) Assignee: ELECTRONICS AND TELECOMMUNICATIONS RESEARCH INSTITUTE, Dae jeon-si (KR)

( * ) Notice: Subject to any disclaimer, the term of this patent is extended or adjusted under 35 U.S.C. 154(b) by 383 days.

(21) Appl. No.: 13/895,673

(22) Filed: May 16, 2013

(65) Prior Publication Data

US 2013/0322442 A1  Dec. 5, 2013

(30) Foreign Application Priority Data

Jun. 1, 2012  (KR) .......................... 10-2012-0059085

(51) Int. Cl.
*H04L 12/18* (2006.01)
*H04L 1/00* (2006.01)

(52) U.S. Cl.
CPC .......... *H04L 12/1845* (2013.01); *H04L 1/0079* (2013.01); *H04L 12/18* (2013.01); *H04L 12/1877* (2013.01)

(58) Field of Classification Search
None
See application file for complete search history.

(56) References Cited

U.S. PATENT DOCUMENTS

2008/0222277 A1*  9/2008  Park ...................... H04L 12/185
                                                                  709/223

FOREIGN PATENT DOCUMENTS

| KR | 1020050081836 A | 8/2005 |
| KR | 1020070012098 A | 1/2007 |
| KR | 1020070081228 A | 8/2007 |
| KR | 1020090130409 A | 12/2009 |

OTHER PUBLICATIONS

Shin-Gak Kan & Sung Hei Kim, Draft Recommendation ITU-T X.603.2, RMCP—Specification for N-plex group applications (for Content), Sep. 10, 2010, pp. 16-17, 23-24, 39, 41 and 69-71.*

* cited by examiner

*Primary Examiner* — Ashley Shivers
(74) *Attorney, Agent, or Firm* — Ladas & Parry LLP

(57) ABSTRACT

Provided are method and apparatus for transmitting session-related parameters required for controlling session maintenance to a multicast agent in a relayed multicast network. The session manager in the relayed multicast network generates control data containing at least one of a T_PPROBE field, an N_PPROBE field, a T_HB field, a N_HB field, a T_HSOLICIT field, an N_HSOLICIT field, a T_HANNOUNCE field, a N_HANNOUNCE field, a T_RELAY field, an N_RELAY field, and a T_LEAVE field, and transmits the generated control data to the multicast agent. Accordingly, relayed multicast service can be provided for each session by setting session-related parameters for each session in a relayed multicast network and transmitting them to a multicast agent.

20 Claims, 6 Drawing Sheets

FIG. 5

| Control type (PARAMETER) (500) | Length (0x10) (505) | T_PPROBE (510) | N_PPROBE (515) |
|---|---|---|---|
| T_HB (520) | N_HB (525) | T_HSOLICIT (530) | N_HSOLICIT (535) |
| T_HANNOUNCE (540) | N_HANNOUNCE (545) | T_RELAY (550) | N_RELAY (555) |
| T_LEAVE (560) | Reserved (0x000000) (565) | | | control data
(PARAMETER control)

METHOD AND APPARATUS FOR TRANSMITTING PARAMETERS TO MULTICAST AGENT IN RELAYED MULTICAST NETWORK

CROSS-REFERENCE TO RELATED APPLICATIONS

Priority to Korean patent application number 10-2012-0059085 filed on Jun. 1, 2012, the entire disclosure of which is incorporated by reference herein, is claimed.

BACKGROUND OF THE INVENTION

1. Field of the Invention

The present invention relates to relayed multicast, and more particularly, to a method and apparatus for transmitting parameters required for a multicast agent's operation.

2. Discussion of the Related Art

Relayed multicast is a method by which efficient group communication is provided to a network that does not support multicast by using a multicast agent (MA) operating on user equipment (UE). The relayed multicast provides a one-to-many or many-to-many multicast function via communication between multicast agents. In order to support mobile node, dedicated agent called mobile multicast agent (MMA) operating on service provider-side equipment is provided. The operation of MMA is similar to that of MA but MMA also conducts operations to support mobile node. In order for multicast agents/mobile multicast agents to communicate with one another, they have to join the same session. Each session is managed by a session manager (SM). Parameters required for a multicast agent's operation in a relayed multicast network and a method of using the same are defined.

In conventional relayed multicast, parameters required to build a relayed multicast network have default values defined for each multicast agent, and these default values are used for a relayed multicast operation. However, even if it is necessary that the parameters have different values for each multicast session depending on the situation to improve the communication efficiency of relayed multicast, there is no method of transmitting newly defined parameters to multicast agents.

SUMMARY OF THE INVENTION

A technical task of the present invention is to provide a method and apparatus for transmitting session-related parameters required for a multicast agent's operation to the multicast agent in a relayed multicast network.

Another task of the present invention is to provide a method and apparatus by which a relayed multicast service operator can set session-related parameters required for a multicast agent's operation which differ for each session in a relayed multicast network.

Still another task of the present invention is to provide a method and apparatus for transmitting session-related parameters required for a multicast agent's operation to the multicast agent through a session manager in a relayed multicast network.

According to an embodiment of the present invention, there is provided a session manager which transmits session-related parameters to a multicast agent in a relayed multicast network. The session manager includes: a processor unit that generates control data containing at least one of a T_PPROBE field, an N_PPROBE field, a T_HB field, a N_HB field, a T_HSOLICIT field, an N_HSOLICIT field, a T_HANNOUNCE field, a N_HANNOUNCE field, a T_RE- LAY field, an N_RELAY field, and a T_LEAVE field; and a transmission unit that transmits the generated control data to the multicast agent.

According to another embodiment of the present invention, there is provided a multicast agent which receives session-related parameters from a session manager in a relayed multicast network. The multicast agent includes: a reception unit that receives, from the session manager, control data containing at least one of a T_PPROBE field, an N_PPROBE field, a T_HB field, a N_HB field, a T_HSOLICIT field, an N_HSOLICIT field, a T_HANNOUNCE field, a N_HANNOUNCE field, a T_RELAY field, an N_RELAY field, and a T_LEAVE field; and a processor unit that controls session maintenance based on the session-related parameters contained in the control data.

According to still another embodiment of the present invention, there is provided a method by which a session manager transmits session-related parameters to a multicast agent in a relayed multicast network. The method includes: setting a specific one of a T_PPROBE field, an N_PPROBE field, a T_HB field, a N_HB field, a T_HSOLICIT field, an N_HSOLICIT field, a T_HANNOUNCE field, a N_HANNOUNCE field, a T_RELAY field, an N_RELAY field, and a T_LEAVE field, to a parameter previously determined for the multicast agent's operation; generating control data containing at least one of the T_PPROBE field, the N_PPROBE field, the T_HB field, the N_HB field, the T_HSOLICIT field, the N_HSOLICIT field, the T_HANNOUNCE field, the N_HANNOUNCE field, the T_RELAY field, and the T_LEAVE field; and transmitting the generated control data to the multicast agent.

According to a further embodiment of the present invention, there is provided a method by which a multicast agent receives session-related parameters from a session manager in a relayed multicast network. The method includes: receiving, from the session manager, control data containing at least one of a T_PPROBE field, an N_PPROBE field, a T_HB field, a N_HB field, a T_HSOLICIT field, an N_HSOLICIT field, a T_HANNOUNCE field, a N_HANNOUNCE field, a T_RE- LAY field, an N_RELAY field, and a T_LEAVE field; and controlling session maintenance based on the session-related parameters contained in the control data.

According to the present invention, parameters required for a multicast agent's operation can be transmitted in a relayed multicast network.

According to the present invention, parameters required for a multicast agent's operation can be set differently for each session in a relayed multicast network to provide a relayed multicast service for each session.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 5 is a structural view of control data containing session-related parameters according to an example of the present invention;

DETAILED DESCRIPTION OF THE PREFERRED EMBODIMENTS

Figure 1:
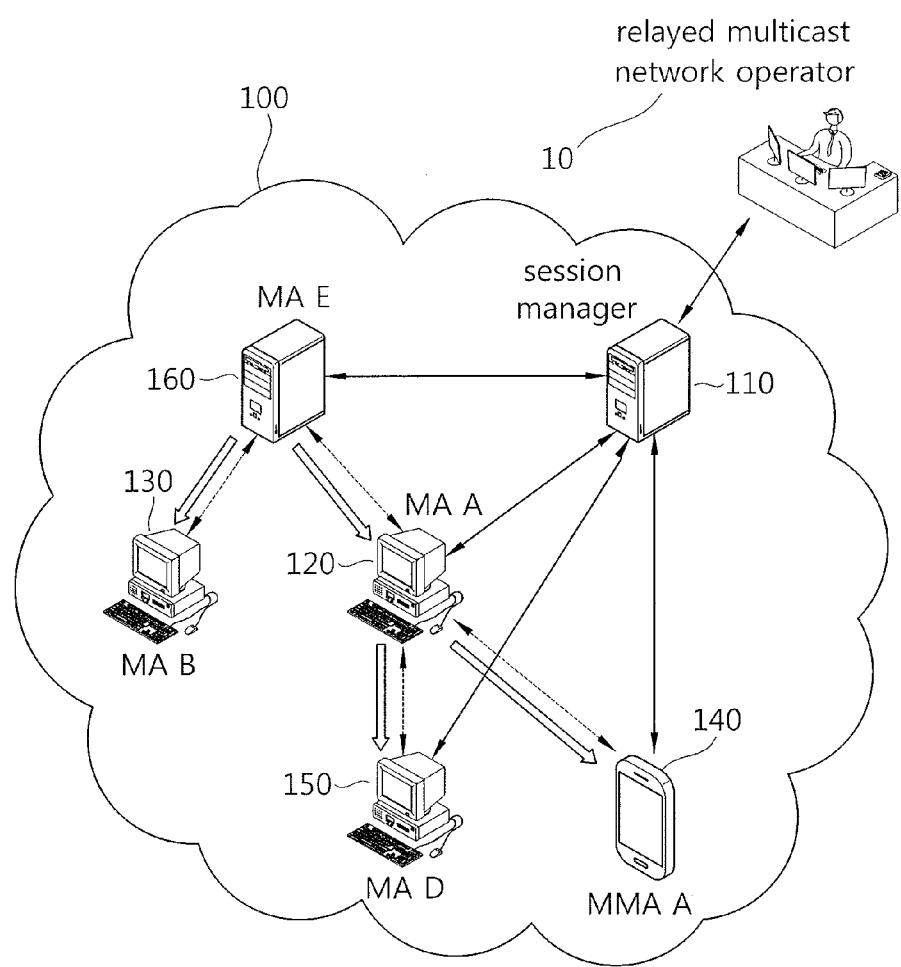
FIG. 1 shows a multicast network operator and a session according to an example of the present invention.

Hereinafter, embodiments of the present invention will be described in detail with reference to illustrative accompanying drawings. In the specification, in adding reference numerals to components throughout the drawings, it is to be noted that like reference numerals designate like components even though components are shown in different drawings. Further, when it is determined that the detailed description of the known art related to the present invention may obscure the gist of the present invention, the detailed description thereof will be omitted.

In describing operations of the components of this specification, the expression "transmit information/message/data/signal" from a component to another component can be used in combination with, or replaced by "transfer information/message/data/signal".

Hereinafter, the term referred to as MA(multicast agent) of the present invention may contain MMA(mobile multicast agent).

FIG. 1 shows a multicast network operator and a session according to an example of the present invention. FIG. 1 shows one-to-many communication as an example of a relayed multicast network.

Referring to FIG. 1, a relayed multicast network includes a relay multicast network operator 10 and a session 100. The session 100 of the relayed multicast network includes a session manager 110 and multicast agents 120, 130, 140, 150, and 160.

The relayed multicast network operator 10 can determine session-related parameters required for a multicast network operation. The relayed multicast network operator 10 can transmit the determined session-related parameters to the session manager 110.

The session manager 110 can manage one session or multiple sessions at the same time, initiate and complete a session, manage membership, and monitor the session state. Also, the session manager 110 can provide session-related parameters required for an operation in a session to the multicast agents 120, 130, 140, 150, and 160. The session-related parameters are parameters which are previously determined by the relayed multicast network operator 10.

The multicast agents 120, 130, 140, 150, and 160 can set up an efficient multicast data delivery path. The multicast agents 120, 130, 140, 150, and 160 can join and leave a session, report the session state, relay content, and so on. The multicast agent 160 may distribute multicast data to other multicast agents 120 and 130 involved in the session. In this case, the distributed multicast data can be transmitted to the multicast agents 120 and 130 according to a relayed multicast tree configured among the multicast agents 120, 130, and 160. The multicast agents 120, 130, 140, 150, and 160 can be implemented in the form of a dedicated server or set-top box, or as part of a client application program.

As described above, the session manager 110 can provide the session-related parameters required for an operation in the session to the multicast agents 120, 130, 140, 150, and 160. Specifically, the session manager 110 can generate control data to be described later with reference to FIG. 5, and set the parameters for each field of the control data and provide them to the multicast agents 120, 130, 140, 150, and 160. The multicast agents 120, 130, 140, 150, and 160 can set session-related parameters of the multicast agents based on the control data, and perform an operation, such as controlling session maintenance, based on data indicated by the parameters set for each field of the control data. There may be various methods of transmitting the control data to the multicast agents 120, 130, 140, 150, and 160. For example, transmission of the control data in a subscription answer message to a subscription request message will be described below.

Figure 2:
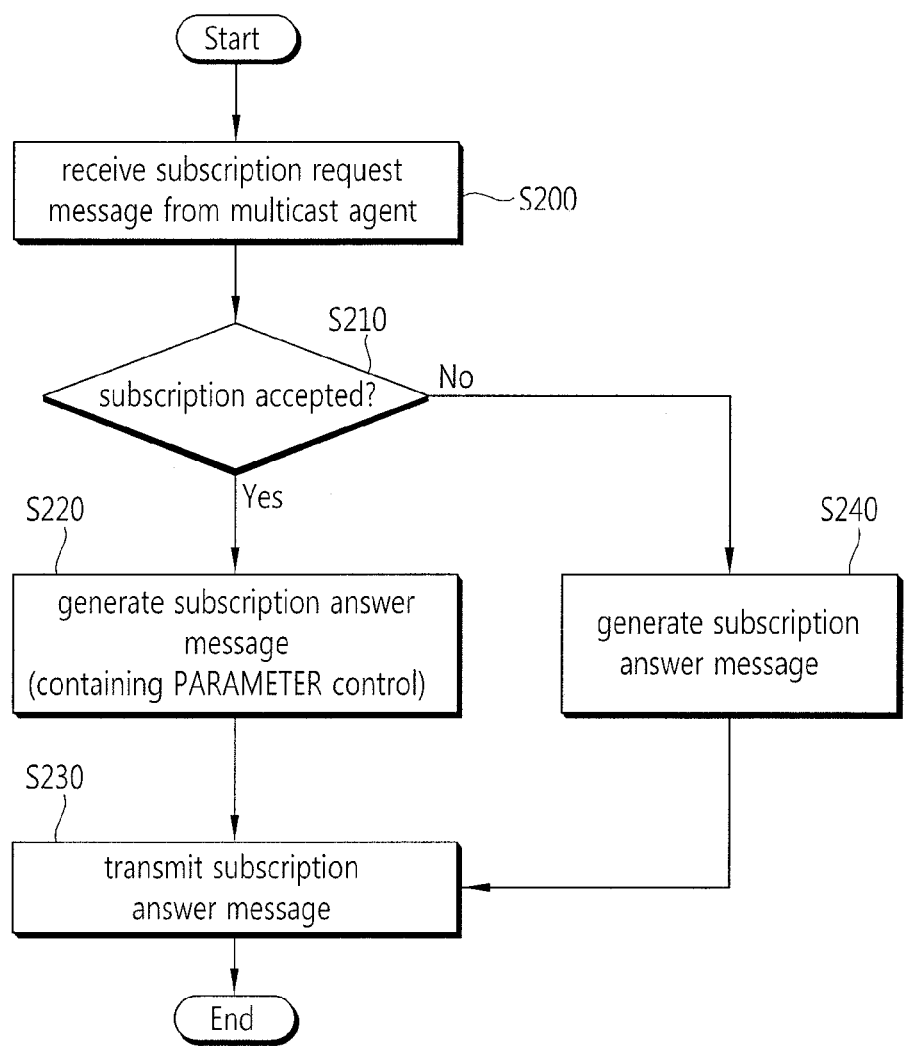
FIG. 2 is a sequential view showing a session manager's operation in a relayed multicast network according to an example of the present invention.

FIG. 2 is a sequential view showing a session manager's operation in a relayed multicast network according to an example of the present invention.

Referring to FIG. 2, the session manager receives, from a (mobile) multicast agent, a message requesting to join a particular session (S200).

The session manager decides whether the multicast agent can join the session (S210).

If the session manager decides to permit the multicast agent to join the session, it checks session-related parameters set for the session and required for the multicast agent's operation, and generates a subscription answer message containing control data which containing the session-related parameters (S220). The control data may be refered to as PARAMETER control. The PARAMETER control is used to deliver the session-related parameters.

The session-related parameters may be determined by the relayed multicast network operator. The session-related parameters may contain data, for example, a retransmission interval of a particular message. In more detail, the session-related parameters can be contained in control data (more specifically, each field constituting the control data) to be described with reference to FIG. 5.

The session manager transmits the answer message to the multicast agent (S230). In this case, the subscription answer message contains the session-related parameters. In this case, the subscription answer message will contain RESULT control indicating subscription acceptance.

Again in S210, if the multicast agent cannot join the session, the session manager generates a subscription answer message indicating subscription rejection (S240). In this case, the subscription answer message will contain RESULT control indicating subscription rejection.

Afterwards, the session manager transmits the answer message to the multicast agent (S230). In this case, the subscription answer message Indicates subscription rejection.

Figure 3:
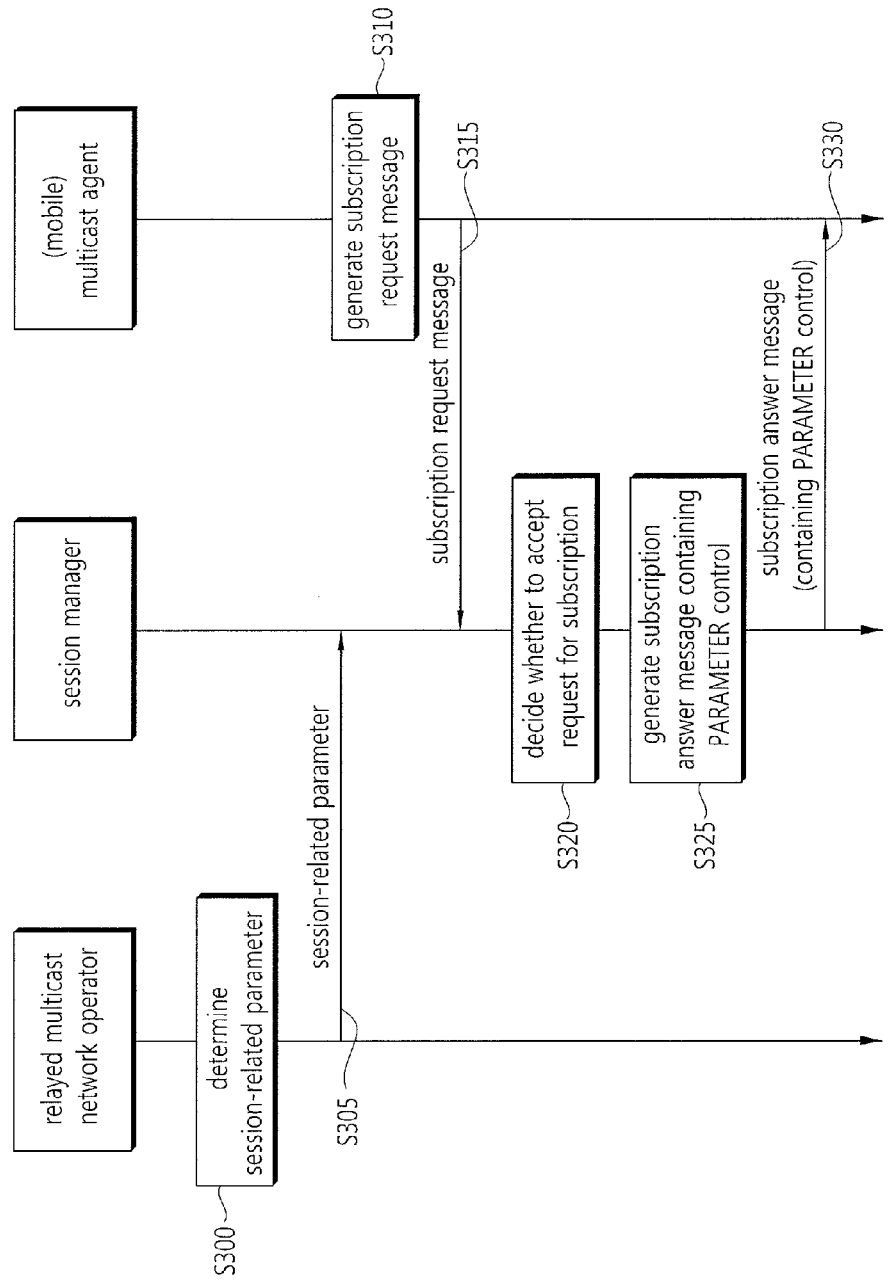
FIG. 3 is a flowchart showing an operation of transmitting session-related parameters to a multicast agent according to an example of the present invention.

FIG. 3 is a flowchart showing an operation of transmitting session-related parameters to a (mobile) multicast agent according to an example of the present invention. In FIG. 3, it is assumed that the session manager permits the multicast agent to join a session.

Referring to FIG. 3, the relayed multicast network operator determines session-related parameters (S300). The session-related parameters contain information about a multicast agent's operation which is determined for a session. For example, the session-related parameters contain information such as a retransmission interval of a particular message. Specifically, the session-related parameters may contain session-related parameter values for each field to be explained with reference to FIG. 5.

The relayed multicast network operator transmits the determined session-related parameters to the session manager (S305).

The multicast agent generates a subscription request message (S310).

The multicast agent transmits the generated subscription request message to the session manager (S315).

The session manager receives the subscription request message, and checks whether to permit the multicast agent to join the session (S320). That is, the session manager checks whether the multicast agent can join the session.

If the session manager permits the multicast agent to join the session, it generates a subscription answer message containing control data (that is, PARAMETER control) (S325). The control data deliver the session-related parameters related to the multicast agent's operation and set for the session (S325). The session-related parameters may be determined by the relayed multicast network operator in S300 and transmitted in S305.

The session manager transmits, to the multicast agent, the subscription answer message containing the parameters (S330).

Afterwards, the multicast agent can join the session based on the subscription answer message, and perform an operation, such as controlling session maintenance, and multicast-based service, based on the parameters contained in the subscription answer message.

Figure 4:
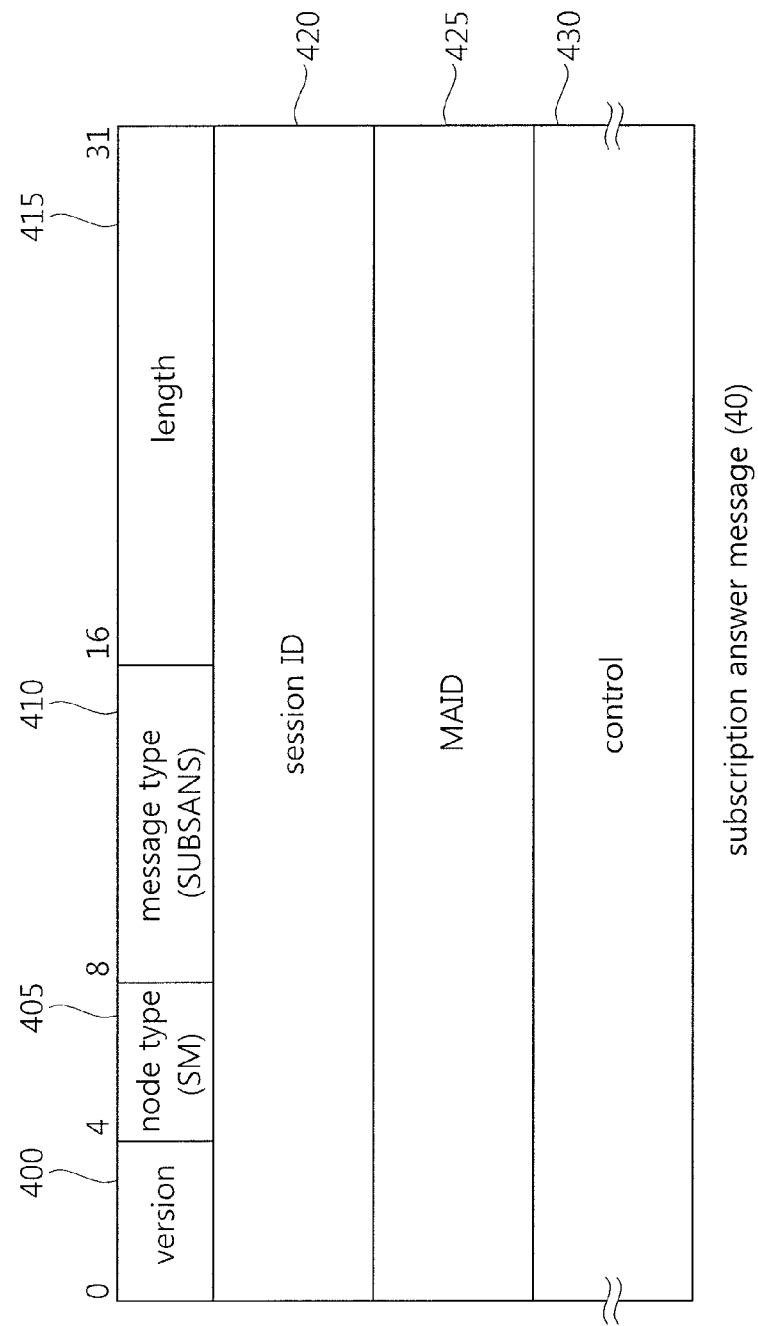
FIG. 4 is a structural view of an subscription answer message that a session manager sends in response to a subscription request from a multicast agent according to an example of the present invention.

FIG. 4 is a structural view of a subscription answer message that a session manager sends in response to a subscription request from a (mobile) multicast agent according to an example of the present invention.

Referring to FIG. 4, the message includes a version field 400, a node type field 405, a message type field 410, a length field 415, a session ID field 420, an MAID (multicast agent ID) field 425, and a control field 430.

The version field 400 denotes an RMCP (relayed multicast protocol) version. The version field 400 may consist of 4 bits.

The node type field 405 denotes the type of node that generates and sends the message. The type of node may be divided into session manager (SM), sender multicast agent (SMA), receiver multicast agent (RMA), and dedicated multicast agent (DMA). The node type field 405 in the message denotes a session manager (SM). The node type field 405 may consist of 4 bits.

The message type field 410 denotes the type of the message. Here, it denotes a SUBSANS (subscription answer) message. The SUBSANS message is a message indicative of whether to permit the multicast agent to join the session. The message type field 410 may consist of 8 bits.

The length field 415 denotes the total length of the message containing the control field 430. The length field 415 may consist of 16 bits.

The session ID field 420 denotes the ID value of the session. The session ID field 420 may consist of 64 bits.

The MAID field 425 denotes the ID value of the multicast agent allocated for the session by the session manager. The MAID field 425 may consist of 64 bits.

The control field 430 denotes control data information contained in the message. Here, the control field 430 may contain information, etc such as a result of a request to join the session, and may contain information required for the multicast agent's operation. The session manager may further include additional control data in the control field 430 in order to transmit session-related parameters required for the multicast agent's operation. The control field 430 has a variable length based on the total length of the message.

Control data containing session-related parameters may be configured in various forms. For example, a structure of the control data according to the present invention will be described as follows.

FIG. 5 is a structural view of control data containing session-related parameters according to an example of the present invention. The control data can be transmitted to a (mobile) multicast agent from the session manager. For example, the control data may be transmitted to the multicast agent from the session manager through a subscription answer message. The expression "transmit the control data through a subscription answer message means that the control data is transmitted in the control field of the subscription answer message.

Referring to FIG. 5, the control data 50 includes a header part 500 and 505 and a data part 510, 515, ..., 565.

The header part 500 and 505 may include a control type field 500 and a length field 505. The control type field 505 denotes the type of the control data 50. The control type field 505 may denote PARAMETER control. In other words, a specific value of the control type field 500 may indicate that the data part 510, 515, ..., 565 of the control data 50 includes at least one of a T_PPROBE field 510, an N_PPROBE field 515, a T_HB field 520, an N_HB field 525, a T_HSOLICIT field 530, an N_HSOLICIT field 535, a T_HANNOUNCE field 540, an N_HANNOUNCE field 545, a T_RELAY field 550, an N_RELAY field 555, and a T_LEAVE field 560. The length field 505 denotes the length of the control data containing the head part 500 and 505 and the data part 510, 515, ..., 565.

The data part 510, 515, ..., 565 includes at least one of the T_PPROBE field 510, the N_PPROBE field 515, the T_HB field 520, the N_HB field 525, the T_HSOLICIT field 530, the N_HSOLICIT field 535, the T_HANNOUNCE field 540, the N_HANNOUNCE field 545, the T_RELAY field 550, the N_RELAY field 555, and the T_LEAVE field 560 that carry the session-related parameters. The data part 510, 515, ..., 565 further includes a Reserved field 565.

The T_PPROBE field 510 may indicate a retransmission interval of a PPROBEQ message. Specifically, the parameter of the T_PPROBE field 510 may indicate a retransmission interval of a PPROBREQ (parent probe request) message used for a neighbor discovery procedure, The parameter of the N_PPROBE field 515 indicates the maximum number of PPROBREQ messages delivered in a single trial. For example, the default value of the parameter of the T_PPROBE field 510 may denote 45 seconds, and the default value of the parameter of the N_PPROBE field 515 may denote five attempts.

The T_HB field 520 indicates a retransmission interval of a HB (heartbeat) message. Specifically, the parameter of the T_HB field 520 indicates a retransmission interval of a HB message used for session tree maintenance. The N_HB field 520 indicates the maximum counts of T_HB timeout before recognition of a network partition. Here, the T_HB timeout occurs if the multicast agent does not receive the HB message until the lapse of the retransmission interval indicated by the parameter of the T_HB field 520. That is, the maximum standby time of the HB message until the multicast agent recognizes a network partition may be equal to (value indicated by parameter of T_HB field 520 * value indicated by parameter of N_HB field 520). For example, the default value of the parameter of the T_HB field 520 may denote 15 seconds, and the default value of the parameter of the N_HB field 525 may denote two counts.

The T_HSOLICIT field 530 indicates a retransmission interval of an HSOLICIT message. Specifically, the parameter of the T_HSOLICIT field 530 may indicate a retransmission interval of an HSOLICIT (Head MA solicit) message used to detect an HMA (Head Multicast Agent) in a multicast network. Here, the HMA is the head of the multicast agents, and performs an operation of relaying multicast data in a local multicast network. The parameter of the N_HSOLICIT field 535 indicates the maximum counts of T_HSOLICIT timeout before recognition of absence of other MAs in the local multicast network. Here, the T_HSOLICIT timeout occurs if the multicast agent does not receive the HSOLICIT message until the lapse of the retransmission interval indicated by the parameter of the T_HSOLICIT field 530. For example, the default value of the parameter of the T_HSOLICIT field 530 may denote 10 seconds, and the default value of the parameter of the N_HSOLICIT field 535 may denote three counts.

The T_HANNOUNCE field 540 indicates an expectation timeout for the HANNOUNCE message. Specifically, the parameter of the T_HANNOUNCE field 540 indicates a period of time the multicast agent waits to receive a HANNOUNCE message used to announce the existence of HMA in the multicast network I response to the HSOLICIT message. The parameter of the N_HANNOUNCE field 545 indicates the maximum counts of T_HANNOUNCE timeout before the multicast agent recognizes HMA absence. Here, the T_HANNOUNCE timeout occurs if the multicast agent does not receive the HANNOUNCE Message until the lapse of the period of time indicated by the parameter of the T_HANNOUNCE field 540. For example, the default value of the parameter of the T_HANNOUNCE field 540 may denote 1 second, and the default value of the parameter of the N_HANNOUNCE field 545 may denote three counts.

The T_RELAY field 550 indicates a retransmission interval of an RELREQ message. Specifically, the parameter of the T_RELAY field 550 may indicate a retransmission interval of a RELEQ (relay request)/RELANS (relay answer) message exchanged between multicast agents to join the session. The parameter of the N_RELAY field 555 indicates the maximum count of T_RELAY timeout before recognizance of connectivity problem between PMA (parent multicast agent) and CMA (child multicast agent). Here, the PMA indicates the next upstream multicast agent in the multicast data delivery path of the relayed multicast network. The CMA indicates the next downstream multicast agent in the data delivery path of the relayed multicast network. Here, the T_RELAY timeout occurs if the multicast agent does not receive the RELEQ/RELANS message until the lapse of the retransmission interval indicated by the parameter of the T_RELAY FIELD 550. For example, the default value of the parameter of the T_RELAY field 550 may denote 6 seconds, and the default value of the parameter of the N_RELAY field 555 may denote three counts.

The T_LEAVE field 560 indicates an expectation timeout for a LEAVANS message. Specifically, the parameter of the T_LEAVE field 560 may indicate a period of time the multicast agent waits until receiving a LEAVANS (leave answer) message after transmitting a LEAVREQ (leave request) message in order to leave the session. For example, the default value of the parameter of the T_LEAVE field 560 may denote 10 seconds.

The Reserved field 565 is a field reserved for future use. The parameter value of the Reserved field 565 shall be set to zero. It shall be ignored by the receiver.

The session manager may set a specific one of the T_PPROBE field 510, the N_PPROBE field 515, the T_HB field 520, the N_HB field 525, the T_HSOLICIT field 530, the N_HSOLICIT field 535, the T_HANNOUNCE field 540, the N_HANNOUNCE field 545, the T_RELAY field 550, the N_RELAY field 555, and the T_LEAVE field 560 to a predetermined parameter for the multicast agent's operation. Here, the specific field indicates a field whose parameter is predetermined by the relayed multicast network operator and which is transmitted to the session manager.

Meanwhile, if the parameter of any one of the T_PPROBE field 510, the N_PPROBE field 515, the T_HB field 520, the N_HB field 525, the T_HSOLICIT field 530, the N_HSOLICIT field 535, the T_HANNOUNCE field 540, the N_HANNOUNCE field 545, the T RELAY field 550, the N_RELAY field 555, and the T_LEAVE field 560, which are contained in the control data 50, is not determined by the relayed multicast network operator, the session manager may set the parameter value of this field to zero and deliver it to the multicast agent. Once the multicast agent confirms that the parameter value of this field is set to zero, the session-related parameter of the multicast agent shall be set to the default parameter value of this field, and session maintenance and multicast-based service can be performed based on this default parameter value. That is, the relayed multicast network operation does not need to determine the parameter values of all the fields contained in the control data 50. For example, if the T_PPROBE field 510, the N_PPROBE field 515, the T_HB field 520, the N_HB field 525, the T_HSOLICIT field 530, the N_HSOLICIT field 535, the T_HANNOUNCE field 540, the N_HANNOUNCE field 545, the T_RELAY field 550, the N_RELAY field 555, and the T_LEAVE field 560 are contained in the control data 50, and the relayed multicast network operator determines only the parameter values of the T_PPROBE field 510, the N_PPROBE field 515, the T_HB field 520, the N_HB field 525, the T_HSOLICIT field 530, and the N_HSOLICIT field 535, among the parameters values of the fields contained in the control data 50, and transmits them to the session manager, the parameter values of the T_PPROBE field 510, the N_PPROBE field 515, the T_HB field 520, the N_HB field 525, the T_HSOLICIT field 530, and the N_HSOLICIT field 535 of the control data 50 that the multicast agent receives from the session manager shall be set to, for examples, values determined by the relayed multicast network operator, whereas the parameter values of the T_HANNOUNCE field 540, the N_HANNOUNCE field 545, the T_RELAY field 550, the N_RELAY field 555, and the T_LEAVE field 560 shall be set to zero. In this case, the multicast agent may set the session-related parameters of the multicast agent by using the parameter values determined by the relayed multicast network operator as the parameter values of the T_PPROBE field 510, the N_PPROBE field 515, the T_HB field 520, the N_HB field 525, the T_HSOLICIT field 530, and the N_HSOLICIT field 535 and using the default parameter values as the parameter values of the T_HANNOUNCE field 540, the N_HANNOUNCE field 545, the T_RELAY field 550, the N_RELAY field 555, and the T_LEAVE field 560. The multicast agent may control session maintenance and perform multicast-based service, based on the session-related parameters.

Figure 6:
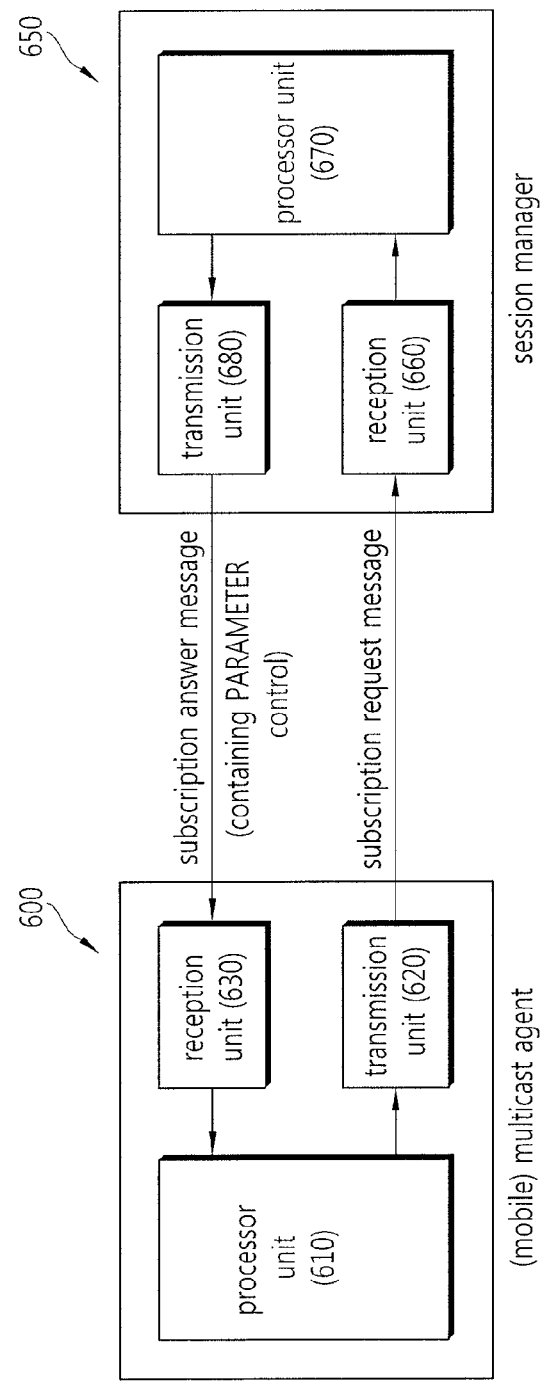
FIG. 6 is a block diagram illustrating a session manager and a multicast agent in a relayed multicast network according to an example of the present invention.

FIG. 6 is a block diagram illustrating a session manager and a (mobile) multicast agent in a relayed multicast network according to an example of the present invention.

Referring to FIG. 6, the session manager 650 includes a reception unit 660, a processor unit 670, and a transmission unit 680.

The processor unit 670 generates subscription answer message contraining control data which containing the session-related parameters associated with a multicast agent 600's operation. In this case, the control data may be refered to as PARAMETER control.

Specifically, the processor unit 670 generates control data containing at least one of a T_PPROBE field, an N_PPROBE field, a T_HB field, a N_HB field, a T_HSOLICIT field, an N_HSOLICIT field, a T_HANNOUNCE field, a N_HANNOUNCE field, a T_RELAY field, an N_RELAY field, and a T_LEAVE field that carry the session-related parameters. Also, the processor unit 670 sets a specific one of the at least one field contained in the control data to a parameter previously determined for the multicast agent's operation. Here, the specific field indicates a field whose parameter is previously determined. Here, the parameter may be previously determined, for example, by the relayed multicast network operator and transmitted to the session manager 650.

Moreover, if there is a field, among the at least one field contained in the control data, whose parameter value is not previously determined, the processor unit 670 may set the field to zero.

Further, the processor unit 670 may generate the control data in such a manner that the control data further includes at least one of a control type field indicating that the control data includes at least one of the T_PPROBE field, the N_PPROBE field, the T_HB field, the N_HB field, the T_HSOLICIT field, the N_HSOLICIT field, the T_HANNOUNCE field, the N_HANNOUNCE field, the T_RELAY field, the N_RELAY field, and the T_LEAVE field and a length field indicative of the length of the control data.

The reception unit 660 may receive a subscription request message from the multicast agent 600. Upon receipt of the subscription request message, the reception unit 660 delivers the subscription request message to the processor unit 670.

The processor unit 670 decides whether to accept the request for subscription based on the subscription request message.

If the processor unit 670 decides to permit the multicast agent 600 to join the session, it generates a subscription answer message including the control data containing session-related parameters related to the multicast agent 600's operation which are set for the session. Here, the session-related parameters may be determined by the relayed multicast network operator and transmitted in advance to the session manager 650. The processor unit 670 delivers the subscription answer message including the control data to the transmission unit 680. In this case, the transmission unit 680 transmits the subscription answer message to the multicast agent 600. That is, the transmission unit 680 transmits the control data to the multicast agent 600 through the subscription answer message.

If the processor unit 670 decides not to permit the multicast agent 600 to join the session, the processor unit 670 generates a subscription answer message indicating subscription rejection, and delivers it to the transmission unit 680. In this case, the transmission unit 680 transmits the subscription answer message to the multicast agent 600.

The multicast agent 600 includes a processor unit 610, a transmission unit 620, and a reception unit 630.

The reception unit 630 receives the control data containing the parameters from the session manager 650. Specifically, the reception unit 630 may receive, from the session manager, the control data containing at least one of the T_PPROBE field, the N_PPROBE field, the T_HB field, the N_HB field, the T_HSOLICIT field, the N_HSOLICIT field, the T_HANNOUNCE field, the N_HANNOUNCE field, the T_RELAY field, the N_RELAY field, and the T_LEAVE field. Here, a specific one of the at least one field contained in the control data shall be set to a parameter previously determined for the multicast agent's operation. Here, the specific field indicates a field whose parameter is previously determined. Also, the reception unit 630 may receive the control data through the subscription answer message (specifically, when the subscription answer message indicates subscription acceptance) transmitted from the session manager 650, in response to a subscription request message. In this case, the answer message may include the structures and information of the answer message and the control data explained in FIGS. 4 and 5.

The received control data may further include a control type field that the control data includes at least one of the T_PPROBE field, the N_PPROBE field, the T_HB field, the N_HB field, the T_HSOLICIT field, the N_HSOLICIT field, the T_HANNOUNCE field, the N_HANNOUNCE field, the T_RELAY field, the N_RELAY field, and the T_LEAVE field. In this case, the processor unit 610 may detect the type of the control data based on the control type field.

The processor unit 610 may control session maintenance and perform multicast-based service based on the parameter values set for at least one field contained in the received control data.

Moreover, the processor unit 610 can join the session based on the subscription answer message (when the subscription answer message indicates subscription acceptance) that the reception unit 630 has received from the session manager 650, set session-related parameters for the multicast agent's operation by using the parameter values indicated by the respective fields of the control data included in the control field of the subscription answer message, and control session maintenance and perform multicast-based service.

If the parameter value of any one of at least one field contained in the control data is set to zero, the processor unit 610 sets the session-related parameter of the multicast agent to the default value of this field, and session maintenance and multicast-based service can be performed(or be controlled) based on this default value.

Moreover, the processor unit 610 may generate a subscription request message. The processor unit 610 may deliver the generated subscription request message to the transmission unit 620.

The transmission unit 620 may transmit the generated subscription request message to the session manager 650. In this case, the reception unit 630 may receive the control data through the subscription answer message generated by the session manager 650, in response to the subscription request message.

As described above, the present invention has been described merely in connection with the exemplary embodiments, and the skilled in this art can make modifications, variations and substitution without departing from the essential scope of the present invention. Accordingly, the exemplary embodiments and the drawing of this invention do not intend to limit but to explain the technical idea of this invention, and the scope of the technical idea of this invention is not limited to the embodiments and the drawings. The protection scope of the present invention should be interpreted with claims appended, and all technical ideas within equivalent scope with this invention should be in the protection scope of this invention.

What is claimed is:

1. A session manager which transmits session-related parameters to a multicast agent in a relayed multicast network, the session manager comprising:
   a processor unit that generates control data containing at least one of a T_PPROBE field, an N_PPROBE field, a T_HB field, a N_HB field, a T_HSOLICIT field, an N_HSOLICIT field, a T_HANNOUNCE field, a N_HANNOUNCE field, a T_RELAY field, an N_RELAY field, and a T_LEAVE field that carry the session-related parameters; and a transmission unit that transmits the generated control data to the multicast agent.

2. The session manager of claim 1, wherein the processor unit sets at least one field contained in the control data to a parameter previously determined for the multicast agent's operation, and if there is a field, among the at least one field contained in the control data, whose parameter value is not previously determined, the processor unit sets the field to zero.

3. The session manager of claim 2, further comprising a reception unit that receives the previously determined parameter from a relayed multicast network operator.

4. The session manager of claim 1, wherein the processor unit generates the control data in such a manner that the control data further comprises at least one of a control type field indicating that the control data includes at least one of the T_PPROBE field, the N_PPROBE field, the T_HB field, the N_HB field, the T_HSOLICIT field, the N_HSOLICIT field, the T_HANNOUNCE field, the N_HANNOUNCE field, the T_RELAY field, the N_RELAY field, and the T_LEAVE field and a length field indicative of the length of the control data.

5. The session manager of claim 1, further comprising a reception unit that receives a subscription request message from the multicast agent, wherein the processor unit generates a subscription answer message in response to the received subscription request message, and the transmission unit transmits the generated control data to the multicast agent through the subscription answer message.

6. A multicast agent which receives session-related parameters from a session manager in a relayed multicast network, the multicast agent comprising:

a reception unit that receives, from the session manager, control data containing at least one of a T_PPROBE field, an N_PPROBE field, a T_HB field, a N_HB field, a T_HSOLICIT field, an N_HSOLICIT field, a T_HANNOUNCE field, a N_HANNOUNCE field, a T_RELAY field, an N_RELAY field, and a T_LEAVE field that carry the session-related parameters; and a processor unit that controls session maintenance based on the session-related parameters contained in the control data.

7. The multicast agent of claim 6, wherein, if the parameter value of any one of the at least one field contained in the control data is set to zero, the processor unit performs session maintenance and control based on the default value of this field.

8. The multicast agent of claim 6, wherein the received control data further comprises a control type field indicating that the control data includes at least one of the T_PPROBE field, the N_PPROBE field, the T_field, the N_HB field, the T_HSOLICIT field, the N_HSOLICIT field, the T_HANNOUNCE field, the N_HANNOUNCE field, the T_RELAY field, the N_RELAY field, and the T_LEAVE field.

9. The multicast agent of claim 6, wherein the received control data further comprises a length field indicative of the length of the control data.

10. The multicast agent of claim 6, further comprising a transmission unit that transmits a subscription request message to the session manager, wherein the processor unit generates the subscription request message, and the reception unit receives the control data through a subscription answer message transmitted from the session manager in response to the subscription request message.

11. A method by which a session manager transmits session-related parameters to a multicast agent in a relayed multicast network, the method comprising:

generating control data containing at least one of a T_PPROBE field, an N_PPROBE field, a T_HB field, a N_HB field, a T_HSOLICIT field, an N_HSOLICIT field, a T_HANNOUNCE field, a N_HANNOUNCE field, a T_RELAY field, an N_RELAY field, and a T_LEAVE field that carry the session-related parameters, to a parameter previously determined for the multicast agent's operation; and transmitting the generated control data to the multicast agent.

12. The method of claim 11, further comprising:

setting at least one field contained in the control data to a parameter previously determined for the multicast agent's operation; and if the parameter value of one of the at least one field contained in the control data is not previously determined, setting the field to zero.

13. The method of claim 12, further comprising receiving the previously determined parameter from a relayed multicast network operator.

14. The method of claim 11, wherein the control data further comprises at least one of a control type field indicating that the control data includes at least one of the T_PPROBE field, the N_PPROBE field, the T_HB field, the N_HB field, the T_HSOLICIT field, the N_HSOLICIT field, the T_HANNOUNCE field, the N_HANNOUNCE field, the T_RELAY field, the N_RELAY field, and the T_LEAVE field and a length field indicative of the length of the control data.

15. The method of claim 11, further comprising:

receiving a subscription request message from the multicast agent; and generating a subscription answer message in response to the received subscription request message, wherein the generated control data is transmitted through the generated subscription answer message.

16. A method by which a multicast agent receives session-related parameters from a session manager in a relayed multicast network, the method comprising:

receiving, from the session manager, control data containing at least one of a T_PPROBE field, an N_PPROBE field, a T_HB field, a N_HB field, a T_HSOLICIT field, an N_HSOLICIT field, a T_HANNOUNCE field, a N_HANNOUNCE field, a T_RELAY field, an N_RELAY field, and a T_LEAVE field that carry the session-related parameters; and controlling session maintenance based on the session-related parameters contained in the control data.

17. The method of claim 16, wherein, if the parameter value of any one of the at least one field contained in the control data is set to zero, session maintenance and control is performed based on the default value of this field.

18. The method of claim 16, wherein the received control data further comprises a control type field indicating that the control data includes at least one of the T_PPROBE field, the N_PPROBE field, the T_HB field, the N_HB field, the T_HSOLICIT field, the N_HSOLICIT field, the T_HANNOUNCE field, the N_HANNOUNCE field, the T_RELAY field, the N_RELAY field, and the T_LEAVE field.

19. The method of claim 16, wherein the received control data further comprises a length field indicative of the length of the control data.

20. The method of claim 16, further comprising:
   generating a subscription request message; and
   transmitting the generated subscription request message to the session manager,
   wherein the control data is received through a subscription answer message in response to the subscription request message.

* * * * *